Patented July 10, 1923.

1,461,167

UNITED STATES PATENT OFFICE.

WALTER EDWIN TRENT, OF WASHINGTON, DISTRICT OF COLUMBIA.

CARBONACEOUS FUEL.

No Drawing. Application filed June 19, 1922. Serial No. 569,329.

*To all whom it may concern:*

Be it known that I, WALTER E. TRENT, citizen of the United States, residing at Washington, in the District of Columbia, have invented certain new and useful Improvements in Carbonaceous Fuel, of which the following is a specification.

The invention relates to an improved carbonaceous fuel composed largely of the carbonaceous content of coal, lignites, ashes or other carbonaceous fuel bearing materials, a hydrocarbon oil, and a small quantity of water.

It is an object of the invention to provide a composite carbonaceous fuel of a plastic consistency composed of finely pulverized carbonaceous material, hydrocarbon oil, and a small quantity of absorbed and entrained water. The fuel preferably consists of a plastic mass composed of a series of amalgamated masses or nodules, each amalgamated mass or nodule consisting of a vast multitude of the fine coal particles having oil coatings. Water is absorbed within the small pores of some of said coal or carbonaceous particles and is likewise trapped beneath the oil coating surrounding the multitude of particles. Water is also interspersed between a series of the amalgamated masses forming the plastic fuel.

In producing my fuel I preferably use the carbonaceous content of coal which has been largely freed of its natural ash and which has been reduced to an exceedingly fine state of subdivision. The fine carbonaceous particles after reduction are saturated in a body of water so that water is absorbed in a number of the pores in the fine particles. A great many of the individual particles are separately coated or surrounded by thin films of oil and a multitude of such fine particles are combined or coalesced in a plastic aggregate or amalgamated mass surrounded by an exterior thin film or surface of hydrocarbon oil. This oil film retains in each amalgamated mass of particles surrounded thereby some mechanically entrained water, and manifestly when a multitude of amalgamated masses are brought into contact during formation certain free water is trapped between the oil coatings or surfaces of such masses, and it is highly desirable to produce a fuel having this water content.

The fuel forming the subject matter of this invention contains certain definite relative quantities of oil, comminuted carbonaceous matter and water within narrow limits. The substances must be within certain definite proportions in order to produce a fuel containing the characteristics and properties of the present fuel which will render it highly successful in use for the manufacture of water gas, domestic purposes, in steam boilers, power plants for engines, etc. The relative quantity of oil, coal and water in the fuel varies slightly depending upon the consistency of the product, and also upon the character of the oil and coal employed, but I have found that with ordinary coals of the bituminous type reduced to 100 degree mesh and with the usual hydrocarbon fuel oil, the proportions by weight should be within the limits of substantially 15 to 30 per cent oil, 5 to 10 per cent water and 60 to 80 per cent comminuted carbonaceous material, which of course contains some impurities.

The herein described fuel product may be produced by the process disclosed in my Patent No. 1420164, June 20, 1922, and is a continuation in part of the application resulting in said patent. By the process disclosed in said co-pending application finely comminuted coal is placed in water suspension and a quantity of oil added thereto, the substances being agitated to cause the coal to combine in a plastic mass or masses largely excluding water and gangue. The product thus produced and forming the subject matter of this application is therefore one which consists largely of the purified carbonaceous content of coal, purified oils and a small quantity of absorbed and entrained water.

A still further object of this invention is to provide a composite plastic fuel of the nature herein described, wherein the hydrocarbon oil employed has been topped for the removal of the volatile constituents so that said oil is substantially free of volatile substances and the fuel may be used without danger of explosions, etc. from explosive vapors.

The foregoing fuel may be produced in many different ways, but the coal, lignites, or the like are preferably reduced to the desired fineness by passage through a wet grinding machine of the ball or rod type. The coal is usually reduced to an impalpable powder, so as to pass a screen from 100 to 200 meshes per linear inch, which results in a physical detachment of a large proportion of the carbonaceous content of the coal from such impurities as ash, silica, silicates, etc. The fine material is then placed in water suspension and mixed with a hydrocarbon oil, such as fuel oil. The agitation of the substances when the oil is used in a proportion of from approximately 20 to 35 per cent by weight to the carbonaceous content of the coal results in the formation of an amalgamated mass or a plurality of small amalgamated masses consisting of a multitude of fine coal particles, hydrocarbon oil and a small percentage of water. The oil, carbon particles and water take a plastic consistency, and the originally detached gangue of the coal is substantially excluded, being carried away by the water in which said gangue is suspended. Both the oil and coal forming two constituents of the amalgam are therefore substantially purified. It is to be observed that the coal is originally ground wet, or is introduced in water suspension before the oil is added, so that small pores in the fine particles of coal absorb and retain certain small quantities of water before the particles are agglomerated and oil coated which is highly desirable in the present fuel. The agglomerated masses or nodules vary in size, depending upon the time and violence of agitation when the amalgam is being produced. They usually take an oval form, approximately ¼ inch in diameter, and each amalgamated mass or nodule consists of vast numbers of fine individual coal particles.

Each amalgamated mass or nodule therefore contains an inestimable number of exceedingly fine coal particles, a great many of which have absorbed water in the pores thereof and which are individually coated by a film of oil, the multitude of said particles being of course surrounded by an oil film forming the amalgamated mass or aggregate. The said oil film of each aggregate also usually contains therein a small quantity of mechanically entrapped water. When a number of said amalgamated masses or aggregates are formed and become united or adhere to one another, there is also enclosed or entrapped between said amalgamated masses some free water. The quantity of this entrapped water may be reduced by subsequent treatment of the amalgam, such as by centrifuging pressure, or like methods, when it is desired to lower the water content. The amalgam, however, always contains certain definite quantities of oil, comminuted carbonaceous matter, and water within relatively narrow limits. A fuel product composed of bituminous coal, fuel oil, and water, usually contains said substances in about the following proportions by weight: fuel oil from 15 to 30 per cent, comminuted carbonaceous matter of the bituminous coal with some impurities varying from approximately 60 to 80 per cent, and water varying from 5 to 10 per cent. When the product contains the lowest quantities of oil and water, then it is quite dry and crumbly. However, the mass still remains plastic, although it is more moist when larger or the maximum quantities of the oil and water are contained therein, and it will be appreciated that the larger quantities of oil may be most desirable in certain uses where a fuel of an exceedingly high heat value is desired. The amalgamated masses are of a consistency resembling that of mortar, and, as hereinbefore stated, consists of fine individual particles of coal or other carbonaceous matter having an applied quantity of water absorbed therein, or clinging to the surface of the coal particles as a film, around which there is the thin film of oil serving to entrap the water. A series of these individual particles are united together by the applied oil and form the plastic mass. Each treated particle has the inner carbonaceous mineral material, the applied or intermediate water and the external coating of oil, all of which has been hereinbefore described.

In producing the plastic masses I have also found that where the maximum quantities of oil is used, this oil serves to displace water, and therefore the more oil formed in the mass the less the water content.

The presence of the water and the oil in the fuel is most desirable in nearly all uses. They provide with the comminuted carbonaceous material an ideal fuel for the production of water gas, and for domestic uses. The fuel will not be dust or blow, being of a plastic consistency and is easy to handle. It is also a fuel which is most desirable for use on ships, steam boiler plants, and the like, as it has been found that a quantity of this fuel stored within a given space will evaporate a great deal more water and produce more heat than can be produced from a like quntity of coal or oil stored in a similar space.

Having thus described my invention, what I claim is:

1. A composite fuel composed of finely comminuted carbonaceous material, oil and water within substantially the following proportions by weight; 60 to 80 per cent comminuted carbonaceous material, 15 to 30 per cent oil and 5 to 10 per cent water, said fuel being of substantially a plastic consistency.

2. A composite fuel of a plastic consistency and composed principally of finely divided carbonaceous material, oil and water, the oil content of the fuel being of a quantity constituting at least 15 per cent of the mass by weight.

3. A composite fuel of a plastic consistency and composed principally of finely divided carbonaceous material and oil, the oil content of the fuel being of a quantity of at least 15 per cent of the mass by weight, with a carbon content of at least 60 per cent by weight and a water content of at least 5 per cent thereof by weight.

4. A composite fuel composed principally of finely comminuted carbonaceous material, hydrocarbon oil and water, said fuel being of a plastic consistency and having the individual carbonaceous particles enveloped by oil films with a multitude of said individually developed particles formed into a plastic mass having an oil coating, the materials in said plastic mass being in the proportion of at least 50 per cent comminuted carbonaceous material to at least 20 per cent oil and 5 per cent water by weight.

5. A composite carbonaceous fuel of a plastic consistency composed of finely divided solid mineral carbonaceous particles, said individual particles containing applied water, external coatings of oil liquid at normal atmospheric temperatures surrounding a number of said individual particles and trapping therein the applied water, a vast multitude of the particles being assembled in a plastic state and enclosed by an oil film extending around said assembled particles.

6. A composite carbonaceous fuel of a plastic consistency composed of finely divided solid mineral carbonaceous particles, the pores of which contain applied absorbed water, external coatings of oil liquid at normal atmospheric temperatures surrounding a number of said individual particles and trapping therein the absorbed water, a vast multitude of the particles being assembled in a plastic state and enclosed by an oil film extending around said assembled particles, said oil film having trapped therein a small amount of free water.

7. A composite carbonaceous fuel of a plastic consistency composed of finely divided solid carbonaceous mineral particles, said particles containing applied water, external coatings of oil surrounding the water containing individual particles and trapping therein the applied water, a multitude of said particles being assembled by oil into a plastic mass.

In testimony whereof I affix my signature.

WALTER EDWIN TRENT.